(12) United States Patent
Horovitz

(10) Patent No.: US 9,029,026 B2
(45) Date of Patent: May 12, 2015

(54) ATMOSPHERIC SELF-CHARGING BATTERY

(75) Inventor: Michael Lee Horovitz, Savannah, GA (US)

(73) Assignee: Omega Energy Systems, LLC, Savannah, GA (US)

(*) Notice: Subject to any disclaimer, the term of this patent is extended or adjusted under 35 U.S.C. 154(b) by 706 days.

(21) Appl. No.: 13/412,932

(22) Filed: Mar. 6, 2012

(65) Prior Publication Data

US 2012/0258373 A1    Oct. 11, 2012

Related U.S. Application Data

(60) Provisional application No. 61/464,728, filed on Mar. 8, 2011, provisional application No. 61/517,897, filed on Apr. 27, 2011.

(51) Int. Cl.
*H01M 14/00* (2006.01)
*H01M 12/06* (2006.01)

(52) U.S. Cl.
CPC ................................ *H01M 14/00* (2013.01)

(58) Field of Classification Search
CPC ............................... H01M 14/00; H01M 12/06
USPC .................................. 429/405, 231.1, 231.5
See application file for complete search history.

(56) References Cited

U.S. PATENT DOCUMENTS

| 4,032,417 | A | * | 6/1977 | Peterson | 205/535 |
| 6,232,019 | B1 | * | 5/2001 | Wunder et al. | 429/300 |
| 2008/0131778 | A1 | * | 6/2008 | Watanabe et al. | 429/220 |

* cited by examiner

*Primary Examiner* — Tracy Dove
(74) *Attorney, Agent, or Firm* — Miles & Stockbridge P.C.

(57) ABSTRACT

A battery (10) is disclosed having a negative or anodic half cell (12) and a cathodic or positive half cell (13). The positive and negative half cells are encased within a fabric within a non-conductive housing (14). The housing includes holes (18) which allow the passage of ambient air. The anodic material (20) is preferably a transition metal bronze such as $Na_{0.9}W_{0.75}Ti_{0.25}O3$. The positive half cell is made of a cathodic material (25) in the form of powder which is encased a fabric (26). The cathodic material is preferably $Na_{0.9}W_{0.75}P_{0.25}O_{3.325}$. The battery also includes an electrical conductor (31) in electrical contact with the positive half cell and the negative half cell. The electrical conductor includes a switch (35) which may be opened and closed to couple the half cells together to produce an electric current through a load (36).

16 Claims, 13 Drawing Sheets

Chemical Activity During Oxidation from $W^{+6}$, $W^{+5}$, $W^{+4}$ in the Positive 1/2 cell

| Typical Productive Bonds | Reducing with circuit electrons captured (neg. charge -0-) | Electrons contributed by Anion (Na) if present | Oxygen Species relate to atmosphere | Recombined oxidized W-O-W with Atmospheric $O_2$ species | Final Position Electrons Reduced Conduction | | |
|---|---|---|---|---|---|---|---|
| $W^{+6}$- o -$W^{+6}$ $W^{+5}$- $W^{+5}$ $W - W$ | | | | | Cations | Bond | |
| $W^{+6}$- $O^{-1}$- $W^{+6}$ | 1 | 0 | O | $W^{+5}$- $O^0$ - $W^{+6}$ | 1 | | |
| $2W^{+6}$- $O^{-2}$- $W^{+6}$ | 2 | 0 | 2(O) | $2W^{+5}$- O - $W^{+5}$ | 2 | | |
| $2W^{+6}$- $(O-O)^{-2}$- $W^{+6}$ | 1 | 0 | O-O | $2W^{+5}$- $(O-O)^0$ - $W^{+5}$ | 2 | | |
| $W^{+6}$- $(O-O)^{-1}$- $W^{+6}$ | 2 | 0 | O-O | $W^{+5}$- $(O-O)^{-1}$- $W^{+5}$ | 2 | | |
| $W^{+6}$- $O^{-2}$- $W^{+6}$ | 1 | 0 | $O^{-2}$ | $W^{+6}$- O - $W^{+4}$ | 2 | | |
| $W^{+6}$- $O^{-1}$- W | 1 | 1 | (O) | $W^{+5}$- $O^0$ -A ($W^{+6}$) | 1 | 1 | |
| $2W^{+6}$- $O^{-2}$- $W^{+5}$ | 2 each | 1 | 2(O) = $O_2$ | $W^{+5}$- $O^{-1}$ - A($W^{+5}$) | 2 | 1 | |
| $2W^{+6}$- $(O-O)^{-1}$- $W^{+6}$ | 1 | 1 | O-O | $2W^{+5}$- $(O-O)^{-1}$ - A($W^{+5}$) | 2 | 1 | |
| $W^{+6}$- $(O-O)^{-1}$- $W^{+6}$ | 1 | 1 | O-O | $W^{+5}$- $(O-O)^{-1}$- A($W^{+5}$) | 2 | 1 | |
| $W^{+6}$- $O^{-2}$- $W^{+6}$ | 1 | 1 | $O_2$ | $W^{+6}$- $O^{-1}$- $A^{+1}(W^{+4})$ | 2 | 1 | |
| $W^{+6}$- $O^{-2}$- $W^{+6}$ +O Except $W^{+6}$ for | 2 | 2 | | $W^{+5}$- $W^{+5}$ | | | |
| Of W – W $W^{+6}$- $O^{-2}$- $A^+(W^{+6})$ | 2 | 2 | | $W^{+5}$- $W^{+5}$ | | | |

FIGURE 1A

| | Chemical Activity During Oxidation from $W^{+3}$ and $W^{+5}$ in the Positive 1/2 cell | | | | |
|---|---|---|---|---|---|
| | $W_4 O_6$ in cluster $W_4 O_6$ Bond | Circuit electron $W^{+n}$ reducing | (e) electrons contributed by Anion (p) | $O_2$ Species released to Atmosphere | Recombined oxidized bonds with atmospheric oxygen species |
| 1 | $W^{+3} \cdot O^{-1} \cdot W^{-3}$ | 1 | | (0) | $W^{+2} \cdot O \cdot W^{+3}$ |
| 2 | $W \cdot W$ | 0 | 0 | - | $W \cdot W$ |
| 3 | $W^{+3} \cdot O^{-2} \cdot W^{+3}$ | 2 | 0 | $2(O) = O_2$ | $W^{+2} \cdot O^{-1} \cdot W^{+2}$ |
| 4 | $W^{+3} \cdot O^{-1} \cdot W^{+3}$ | 1 | 1 | | $W^{-2} \cdot O^0 \cdot Na \; (W^{+3})$ |
| 5 | $W^{+3} \cdot O^{-2} \cdot W^{+3}$ | 1 | 1 | $2(O) = O_2$ | $W^{-2} \cdot O^{-1} \cdot Na \; (W^{+6})$ |
| 6 | $W^{+3} \cdot O^{-2} \cdot W^{3}$ | 2 | 0 | (0) | $W^{+2} \cdot O^{+2}$ |
| 7 | $W^{+3} \cdot O_1 \cdot W_3$ | 1 | 0 | (0) | $W^{+2} \cdot W^{+3}$ |
| 8 | $W^{+3} \cdot O^{-2} \cdot (W^3)$ | 2 | 2 | (0) | $W^{+2} \cdot (W^{+2})$ |
| | $W_4 O_6$ in cluster $W_4 O_4$ Bond | Circuit electron $W^{+n}$ reducing | (e) electrons contributed by Na | $O_2$ Species released to Atmosphere | Recombined oxidized with atmospheric oxygen species |
| 1 | $W^{+3} \cdot O^{-1} \cdot W^{+3}$ | 1 | 0 | (0) | $W^{+1} \cdot O \cdot W^{+3}$ |
| 2 | $W \cdot W$ | 0 | 0 | 0 | $W \cdot W$ |
| 3 | $W^{+3} \cdot O^{-2} \cdot W^{+3}$ | 2 | 0 | $2(O) = O_2$ | $W^{+2} \cdot O^{-1} \cdot W^{+2}$ |
| 4 | $W^{+3} \cdot O^{-1} \cdot W^{+3}$ | 1 | 1 | (0) | $W^{-2} \cdot O^0 \cdot Na^+ (W^{+1.5})$ |
| 5 | $W^{+5} \cdot O^{-2} \cdot W^{+3}$ | 1 | 1 | $2(O) = O_2$ | $W^2 \cdot O^{-1} \cdot Na^+ (W^{+1.5})$ |
| 6 | $W^{+3} \cdot O^{-2} \cdot W^3$ | 2 | 0 | (0) | $W^{+2} \cdot W^{+2}$ |
| 7 | $W^{+3} \cdot O^{-1} \cdot W^{+3}$ | 1 | 0 | (0) | $W^+ \cdot W^{+2}$ |
| 8 | $W^{+3} \cdot O^+ Na(W^{-1.5})_2$ | 2 | 2 | (0) | $W^{-2} \cdot Na^{+1} (W^{+2})$ |

FIGURE 2

Similar chemistry and circuit as above with the addition of a member of a highly electronegative group - Sodium: $Na_xWO_3$ with X=0.9

| Exterior Circuit | Charged Neg 1/2 cell conduction band | To exterior circuit and local electrons from current only | Reduction in positive 1/2 cells conduction band | | O2 species produced |
|---|---|---|---|---|---|
| 2e → | $2[W^{+6} - O^{-2} \ W^{+6}] + Na$ | 2e → | $2[W^{+5} - O^{-1} \ Na^{+1} \ (W^{+5})]$ | 3e → | 2(O)/$O_2$ |
| 1e → | $2[W^{+6} - (O-O)^{-1} - W^{+6}] + 2Na$ | 2e → | $2[W^{+5} - Na^{+1} - O^{-1} - Na^{+1} \ (W^{+5})]$ | 4e → | 2(O)/$O_2$ |
| 2e → | $2[W^{+6} - O^{-2} - W^{+6}] + Na$ | 2e → | $2[W^{+6}) - O^{-2} - Na^{+1}(W^{+4})]$ | 3e → | 2(O)/$O_2$ |
| 2e → | $2[W^{+6} - O^{-2} - W^{+6}] + Na$ | 2e → | $2[W^{+6} - Na^{+1} \ (W^{+4})]$ | 3e → | 2(O)/$O_2$ |

Redox and Atmospheric chemical interactions between the $W^{+6} - W^{+4}$ 1/2 cells in a circuit: (Non bronzes)

| Exterior Circuit | Charged Neg 1/2 cell conduction band | To exterior circuit and local electrons from current only | Reduction in positive 1/2 cells conduction band | | $O_2$ species produced |
|---|---|---|---|---|---|
| 2e → | $2(W^{+6} - O^{-2} - W^{+6})$ | 2e → | $2(W^{+5} - O - W^{+5})$ | 2e → | $2(O)/O_2$ |
| 1e → | $2(W^{+6} - (O-O)^{-3} - W^{+6})$ | 1e → | $2(W^{+5} - (O-O)^{0} - W^{+5})$ | 2e → | $2(O)/O_2$ |
| 2e → | $2(W^{+6} - O^{-2} - W^{+6})$ | 2e → | $2(W^{+5} - O - W^{+5})$ | 2e → | $2(O)/O_2$ |
| 2e → | $(W^{+6} - (O-O)^{-1} - W^{+6})$ | 2e → | $W^{+5} - (O-O)^{+1} W^{+5}$ | 2e → | $2(O)/O_2$ |

ATMOSPHERIC SELF-CHARGING BATTERY

REFERENCE TO RELATED APPLICATION

Applicant claims the benefit of U.S. Provisional Patent Application Ser. No. 61/464,728 filed Mar. 8, 2011 and U.S. Provisional Patent Application Ser. No. 61/517,897 filed Apr. 27, 2011.

TECHNICAL FIELD

This invention relates generally to batteries, and more particularly to air batteries.

BACKGROUND OF THE INVENTION

Energy storage means that are capable of delivering electrical energy have existed for centuries. Such energy storage means include electrical capacitors and inductors which can store energy in their respective electric and magnetic fields. Other means include electrical battery cells which produce electric current through chemical reactions between selected compounds. Each of these means of energy storage has its disadvantages such as the potential for the leakage of dangerous chemicals, relatively low energy density, and environmentally imposed limitations such as operational temperature ranges.

A significant enhancement to the state-of-the-art in electrical energy storage and safety is achieved when such systems utilize certain modified Transition Metal Oxides (TMO) as the means of energy storage. Some TMOs are several times less reactive, and therefore may be safer to utilize, than typical battery components, both actively and passively.

A characteristic of prior art batteries is that in order to maintain charge balance between the ½ cells in a specific battery, a complete circuit must exist, whereby there has to be an electron flow from the negative electrode through external conducting wire, across an external load, and then into the positive half cell and through an appropriate electrolyte. During this process, there is a specific ion flow from the positive electrode to its respective negative electrode along with a reversed ionic flow from the reversed electrodes via an electrolyte, which maintains the ionic and charge balance.

It would be beneficial to provide an air battery that provides benefits over those of the prior art. Accordingly, it is to the provision of such that the present invention is primarily directed.

SUMMARY OF THE INVENTION

In a preferred form of the invention an air battery comprising a negative half cell having a mass of anode material in electrical contact with an anode current collector, the anode material being positioned within the interior of a housing in fluid communication with ambience, and the anode material being in part, a transition metal bronze. The battery also has a positive half cell having a mass of cathode material in electrical contact with a cathode current collector, the cathode material being positioned within the interior of a housing in fluid communication with ambience, and the cathode material being in part, a transition metal bronze. The battery also includes an electrical conductor extending between and in electrical contact with the positive half cell and the negative half cell, the electrical conductor including an openable switch.

BRIEF DESCRIPTION OF THE DRAWINGS

FIG. 1A is a chart showing the chemical activity during oxidation of an air battery embodying principles of the invention in a preferred form.

FIG. 2 is a chart showing the chemical activity during oxidation.

FIG. 3 is a chart showing the chemical activity.

FIG. 4 is a chart showing the chemical activity.

DETAILED DESCRIPTION

Figure 1B:
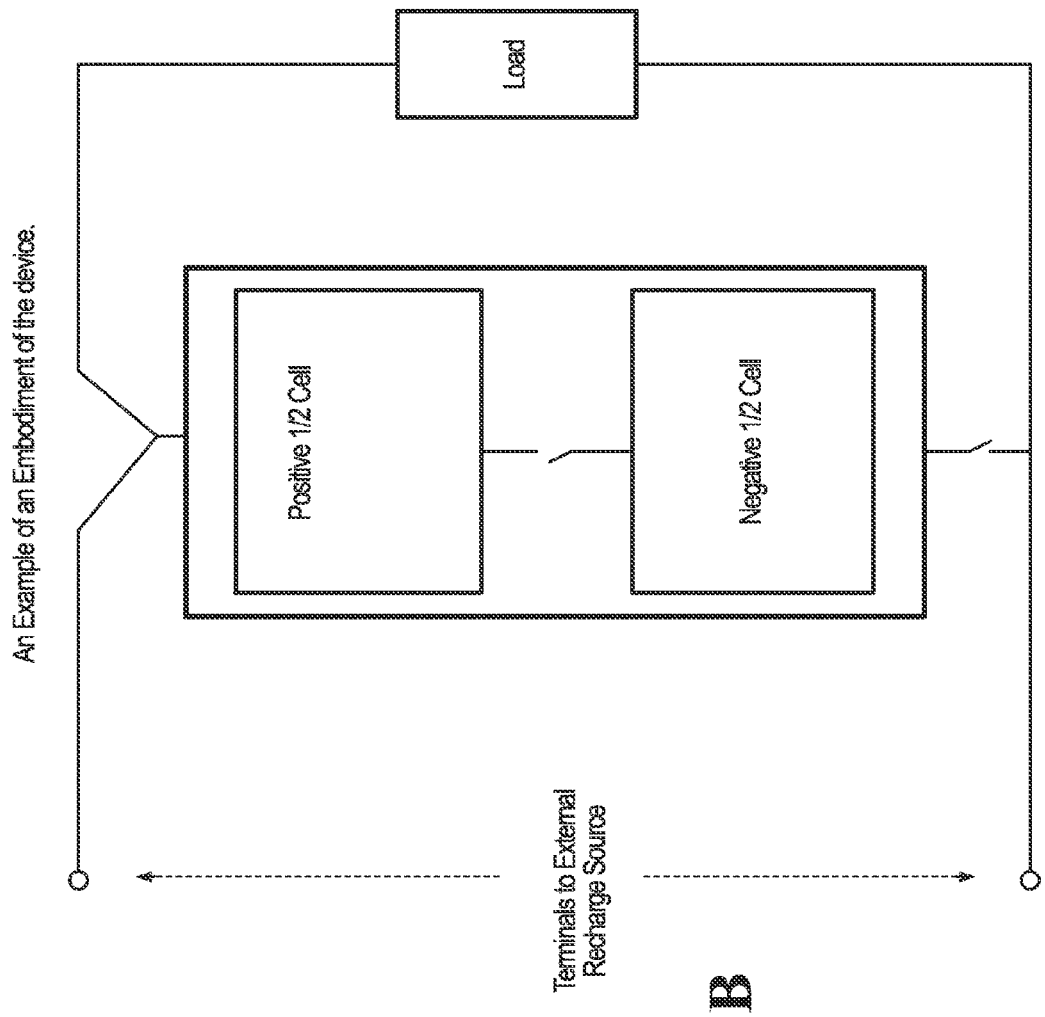
FIG. 1B is a schematic view of a load and battery embodying principles of the invention in a preferred form.

With reference next to the drawings, there is shown in a battery 10 having a positive or anodic half cell 12 and a cathodic or negative half cell 13. Each of the positive and negative half cells 12 and 13 are encased or enclosed within a non-conductive housing 14. The housing 14 includes a first portion 16 encasing the positive half cell 12 and a second portion 17 encasing the negative half cell 13. The housing is made of a solid, inert material such as acrylic material. The housing includes a plurality of pores or holes 18 which allow the passage of ambient air or atmosphere (especially oxygen) through the holes 18 and into the interior of the first and second portions 16 and 17. The holes 18 are preferably about 1 millimeter in diameter, and preferably no less than 1,000 picometers in diameter, with a hole density of approximately 5 holes per square centimeter.

The positive half cell 12 is made of an anodic material or anode 20 in the form of powder or alloy which is encased within a porous, non-reactive fabric enclosure 21, such as fabric made of cotton. The anodic material 20 is preferably a transition metal bronze, such as $Na_{0.9}W_{0.75}Ti_{0.25}O_3$, or as an alternative $Na_{0.9}WO_3$ (or any other 5d transition metal oxide)+a crystalline electro-positive metal, nonmetal or combination thereof ("N"). The anodic material may be a TMO cation or Bronze that can consist of Tungsten, Molybdenum, Niobium, Tantalum, Ruthenium, Vanadium, Chromium, or Manganese. The secondary cation such as all period 1, 2, 3, and 4, $NS^1$, $NS^2$, $NP^1$, $NP^2$ elements, 3d and others. The secondary anions may be all elements in the Halogen group, as well as the 6, 7 and 8 groups and the 3ds. The powder as used has an average diameter size of approximately 63 microns unless the powder is melted. The positive half cell 12 also includes an anode current collector 23 which may be in the form a 20 gauge multi-strand 5 amp copper wire in electrical contact with the anodic material.

The size of the anode 20 depends upon the preferred density of the material utilized. If the material is prepared as the loose powder previously described, the anode should have a maximum thickness of no more than 20 millimeters, and preferably, a thickness of between 4 and 20 millimeters to allow for varying porosity and density due to compression of the material in the less-than-solid form. However, should the anode 20 be in the form of a solid crystalline structure, the maximum thickness should be no more than 4 millimeters.

The negative half cell 13 is made of a cathodic material or cathode 25 in the form of powder or alloy which is encased within a porous, non-reactive fabric enclosure, 26 such as fabric made of cotton. The cathodic material is preferably $Na_{0.9}W_{0.75}Ti_{0.25}O_{3.325}$, or as an alternative $Na_{0.9}WO_3$ (or any other 5d transition metal oxide)+a crystalline electro-negative metal, nonmetal or combination thereof ("N"). The powder has an average diameter size of approximately 63 microns unless the powder is melted. The negative half cell 13 also includes a cathode current collector 27 which may be in the form a 20 gauge multi-strand 5 amp copper wire in electrical contact with the cathode material.

The size of the cathode 25 depends upon the preferred density of the material utilized. If the material is prepared as the loose powder previously described, the cathode should have a maximum thickness of no more than 20 millimeters, and preferably, a thickness of between 4 and 20 millimeters to allow for varying porosity and density due to compression of the material in the less-than-solid form. However, should the cathode 25 be in the form of a solid crystalline structure, the maximum thickness should be no more than 4 millimeters.

The battery 10 also includes an electrical conductor 31 in electrical contact with and extending between the positive half cell 12 and the negative half cell 13. The electrical conductor 31 includes a switch 35 which may be opened and closed to electronically couple the half cells 12 and 13 together to produce an electric current through a load 36 coupled to the battery 10 through an external conductor 37. Electrical conductors 31 and 37 may be a 20 gauge, multi-strand 5 amp copper wire or equivalent structure depending upon the current and load. The switch 35 may be a 5-amp on/off type switch or the like, again depending upon the current and load.

In use, with the closing of switch 35 the positive half cell 12 is in electrical contact with the negative half cell 13. This connection causes electrons to be generated in the positive half cell 12 wherein they are passed through the anode current collector 23 and the electrical conductor 37 until they reach the load 36, wherein they may run a DC electric device or load 36. The remaining electrons continue through conductor 37 and re-enter the battery through the cathode current collector 27 of the negative half cell 13. These electrons travel to the positive half cell through conductor 31 so long as the switch 35 remains closed.

The anode or positive half cell 12 is manufactured in the following manner: Synthesis of $[Na_{0.9}W_{0.75}Ti_{0.25}O_3]$ for the preparation of 25-gram anode rod. A 10-mL high-alumina combustion boat is charged with 16.92 g of sodium tungstate dihydrate. The boat is placed in a tube furnace (2"-diameter quartz tube) in flowing nitrogen. The furnace is ramped to 500 deg. C. over thirty minutes to convert the dihydrate to the anhydrous sodium tungstate. The boat is allowed to cool to room temperature yielding 15.07 grams of anhydrous sodium tungstate. To an agate mortar was added the following: 15.07 grams of anhydrous sodium tungstate, 1.47 grams of tungsten metal powder, 2.28 grams of titanium dioxide and 6.08 grams of tungsten trioxide. The reactants are mixed and ground to a fine powder with an agate pestle. The powder is then sieved through a 235 std. mesh screen (63 micron). A 10-mL alumina combustion boat with nominal dimensions of 90×17×11.5 mm (l×w×h) is sprayed with a boron nitride mold-release spray and then charged with the well-ground powder. A 20-gauge copper wires is placed into the reactant mixture at each end of the boat, taking care to avoid contact between the two wires. The mixture in the boat is tamped down to facilitate contact. The combustion boat containing the reactants is carefully placed into the tube furnace in flowing nitrogen. The mixture is heated to 850 deg. C. according to the temperature program: 25-500 deg. C. over 30 min.; 500 deg. C. hold for 30 min.; 500-850 deg. C. over 30 min.; and 850 deg. C. hold for 2610 min. The furnace is then allowed to cool to ambient temperature. After the crucible had cooled to room temperature, the nitrogen purge is discontinued. The material appeared as a porous, charcoal grey solid. A quantitative yield of 24.9 g is obtained through this process.

Preparation of 50-gram anode rod, 20-mL high-alumina combustion boat is charged with 33.84 g of sodium tungstate dihydrate. The boat is placed in a tube furnace (2"-diameter quartz tube) in flowing nitrogen. The furnace is ramped to 500 deg. C. over thirty minutes to convert the dihydrate to the anhydrous sodium tungstate. The boat is allowed to cool to room temperature yielding 30.14 grams of anhydrous sodium tungstate. To an agate mortar was added the following: 30.14 grams of anhydrous sodium tungstate, 2.94 grams of tungsten metal powder, 4.56 grams of titanium dioxide and 12.16 grams of tungsten trioxide. The reactants are mixed and ground to a fine powder with an agate pestle. The powder is then sieved through a 235 std. mesh screen (63 micron). A 20-mL alumina combustion boat with nominal dimensions of 90×17×11.5 mm (l×w×h) is sprayed with a boron nitride mold-release spray and then charged with the well-ground powder. A 20-gauge copper wires is then placed into the reactant mixture at each end of the boat, taking care to avoid contact between the two wires. The mixture in the boat is tamped down to facilitate contact. The combustion boat containing the reactants was carefully placed into the tube furnace in flowing nitrogen. The mixture is heated to 850 deg. C. according to the temperature program: 25-500 deg. C. over 30 min.; 500 deg. C. hold for 30 min.; 500-850 deg. C over 30 min.; and 850 deg. C. hold for 2610 min. The furnace is then allowed to cool to ambient temperature. After the crucible had cooled to room temperature, the nitrogen purge is discontinued. The material appeared as a porous, charcoal grey solid. A quantitative yield of 49.8 g is obtained through this process.

The cathode or negative half cell 13 is manufactured in the following manner: synthesis of $[Na_{0.9}W_{0.75}P_{0.25}O_{3.325}]$ of 25-gram cathode rod. A 10-mL high-alumina combustion boat is charged with 2.105 g of sodium tungstate dihydrate. The boat is placed in a tube furnace (2"-diameter quartz tube) in flowing nitrogen. The furnace is ramped to 500 deg. C. over thirty minutes to convert the dihydrate to the anhydrous sodium tungstate. The boat is allowed to cool to room temperature yielding 1.875 grams of anhydrous sodium tungstate. To an agate mortar is added the following: 6.25 g of trisodium phosphate, 1.875 g of sodium tungstate, and 16.875 g of tungsten trioxide, and mixed and ground to a fine powder with an agate pestle. The powder is sieved through a 235 std. mesh screen (63 micron). A 10-mL high alumina combustion boat with nominal dimensions of 90×17×11.5 mm (l×w×h) is sprayed with a boron nitride mold-release spray and then charged with the well-ground powder. 20-gauge copper wires were placed into the reactant mixture at each end of the boat, taking care to avoid contact between the two wires. The mixture in the boat is tamped down to facilitate contact. The combustion boat containing the reactants is carefully placed into the tube furnace in flowing nitrogen. The mixture is heated to 700 deg. C. according to the temperature program: 25-500 deg. C. over 30 min.; 500 deg. C. hold for 30 min.;

500-850 deg. C. over 30 min.; and 850 deg. C. hold for 2610 min. The furnace is then allowed to cool to ambient temperature. After the crucible had cooled to room temperature, the nitrogen purge is discontinued. The material appeared as a porous grey solid. A quantitative yield of 25.0 g is obtained through this process.

Preparation of 50-gram rod. A 20-mL high-alumina combustion boat is charged with 4.21 g of sodium tungstate dihydrate. The boat is placed in a tube furnace (2"-diameter quartz tube) in flowing nitrogen. The furnace is ramped to 500 deg. C. over thirty minutes to convert the dihydrate to the anhydrous sodium tungstate. The boat is allowed to cool to room temperature yielding 3.63 grams of anhydrous sodium tungstate. To an agate mortar is added the following: 12.50 g of trisodium phosphate, 3.63 g of sodium tungstate, and 33.75 g of tungsten trioxide, and mixed and ground to a fine powder with an agate pestle. The powder is sieved through a 235 std. mesh screen (63 micron). A 20-mL high alumina combustion boat with nominal dimensions of 105×22×14.5 mm (l×w×h) is sprayed with a boron nitride mold-release spray and then charged with the well-ground powder. 20-gauge copper wires were placed into the reactant mixture at each end of the boat, taking care to avoid contact between the two wires. The mixture in the boat is tamped down to facilitate contact. The combustion boat containing the reactants is carefully placed into the tube furnace in flowing nitrogen. The mixture is heated to 850 deg. C. according to the temperature program: 25-500 deg. C. over 30 min.; 500 deg. C. hold for 30 min.; 500-850 deg. C. over 30 min.; and 850 deg. C. hold for 2610 min. The furnace is then allowed to cool to ambient temperature. After the crucible had cooled to room temperature, the nitrogen purge is discontinued. The material appeared as a porous grey solid. A quantitative yield of 50.0 g is obtained through this process.

Each half cell is separate and therefore does not need to be related by chemical reaction or dependent upon each other for a specific reaction. It should be understood that if a sufficient potential difference exists between the two half cells, conduction will occur between the ½ cells via a conduction wire from the negative half cell through an external load, and terminating in the positive half cell. The following operating conditions should be recognized, however, it should be understood that they do not constitute an exhaustive set of fundamental characteristics. A potential difference between the two half cells must exist, whereby the chemistry in the half cell defined as negative will provide an electric current to an exterior circuit sufficient to run its specific load and will continue flowing to the chemistry in the half cell defined as positive where the reduction occurs. Since the battery contains two independent half cells, there is no need for an electrolyte to aid in the diffusion of specific common ions. Consequently, adverse issues such as internal resistivity, ion balance, and excessive heat produced by ionic current flow, which are associated with prior art batteries and their electrolytic liquids and materials, can be eliminated. A main concern of prior art batteries is charge balance resulting from the change in oxidation state of the primary cation during electronic discharge and the reverse condition of the positive half cell that completes the circuit. With an appropriate selection of molecules for the respective half cells of our battery, electronic charge balance problems can be eliminated. Charge balance between the molecules in the two half cells is maintained by charged and uncharged oxygens and oxygen species in the atmosphere, which results in conjunction with band electron reactions and, electrons filling the conduction band via intercalated anions. The individual and active structure's geometry, like shown in FIGS. 6 and 7, will tend to change with the varying charge balancing conditions, which is caused by changes in oxidation states of TMO cations during redox operations because the number of bonded oxygens per molecule is in direct correlation with the TMO's cationic charge. The number of oxygen molecules, the structural geometry, and the properties of the conduction band will also vary during redox activity of the battery. Continued redox charge balancing occurs via an electronic connection (via conduction circuits) between the half cells. This internal chemical reaction pathway aids in recharging and maintains a constant voltage.

The battery 10 described herein states that the chemistry of the half cells are independent of each other with no need for a typical electrolyte allowing ions to travel between the half cells during redox activities in order to help maintain charge balance, which eliminates the traditional issues of prior art batteries resulting from low ion conductivity of typical electrolytes. The battery merely requires a very thin piece of plastic or other non-conductive material containing pores that allow the unencumbered flow of oxygen and its ionic species between the two half cells and the ambient atmosphere. However, the chemistry in the two half cells could be modified to work in the presence of acidic or basic electrolytes, if necessary.

The molecular oxygen and varying redox needs of the cations and the molecules in the two half cells can be somewhat challenging, whereby the thermodynamic parameters (bond energies, redox potentials, ionization potentials, etc.) must be designed to form a unified system. For demonstration purposes, molecules based on Tungsten oxides and bronzes have been chosen. Atmospheric oxygen works in tandem as a carrier for oxygen redox by-products and as a regenerator of an original $W^{+n}$—O—$W^{+n}$ bond.

A description of the new mechanism is shown in FIGS. 1.*a* and 1.*b* which may be used to illustrate the basic mechanisms of the electronic reactions which are most commonly associated with the charge states $W^{+6}$ through $W^{+4}$. Only single examples of each will be given. Reactions are shown from the orientation of the negative half cell. FIG. 1.*a* illustrates unit chemical cells of Tungsten oxide and bronzes having oxidation states ranging from +6 to +5 to +4 along with its associated and basic chemical activities. FIG. 1.*b* shows a general physical embodiment of the structure containing positive and negative half cells along with a particular circuit configuration connecting the positive and negative half cells to each other, an external recharge source, an external load, and circuit control switches. FIG. 2 illustrates basic chemical activity during oxidation states ranging from +3 to +2 to +1 in the positive half cell.

Even though the positive and negative half cells are chemically separate and have no need for a common electrolyte for charge balance of chemically related ions, common processes associated with the electronic current do exist and are necessary to maintain a discharge of electrons to the external world from the negative half cell, through one or more external loads, and back into the chemistry of the positive half cell. The metal in the positive half cell is reduced, and its potential is positive with respect to that of the negative half cell where the electrons exit the battery via a conductive lead after oxidation. In order to achieve high voltage between the positive and negative half cells, the chemistries of the electropositive and electronegative half cells must have a substantial voltage difference. There are two conditions with regard to the chemistries in the half cells:

1. There has to be a relationship between the oxygens in the chemical structures comprising the electronegative and electropositive half cells along with the oxidation states of the primary metal of the two chemistries (bronzes) in order to maintain balance. In the high oxidation states, it is necessary for the bonds to be identical, i.e., if both geometries are octahedral for two molecules of 4d or 5d Bronzes, such as $Na_{0.9}MO_3$, all of the bonds are W—O—W with an identical molecular connection via the terminal oxygens.

2. Several sources of electrons are available to the chemistry of the half cells, which include but are not limited to the following:

i) The electrons that balance the redox charges of the Transition Metal (TM) cations, which originate from their respective redox chemistry as the result of internal chemical reactions or external recharging.

ii) The electrons that originate from the anions, which are intercalated into one or both of the oxides. These electrons are located in their respective conduction bands.

iii) A third source is supplied by electrons resulting from the internal reactions and/or removal of oxygen from M-O-M bonds. The two half cells are connected by a conduction wire, and the high availability of oxygen from the atmosphere provides constant voltage regeneration due to continuous redox reactions, which maintain an equilibrium voltage due to an electronic conduction between half-cells.

As will be explained further, Tungsten bronze oxides are very good choices for the solid-state chemistries of the positive and/or negative half cells. For this to be possible, W—O—W bond strengths, the number of oxygen molecules per Tungsten, and the metallic conductivity of the electrons in the two half cells must be able to work in a reciprocal manner.

A unique characteristic of the new embodiment is that the individual repeating molecules in the positive and negative half cells can be largely similar. To illustrate, Tungsten bronze ($Na_{0.9}MO_3$) will again be used as an example. The molecule in the +6 oxidation state would have the same structure undergoing either oxidation or reduction. The difference being that: 1) the electropositive "M" could be an alloy consisting of 75% Tungsten and 25% of an electropositive metal and 2) The electronegative "M" in the tungsten bronze, in the negative half cell would be a similar alloy consisting of 75% Tungsten and 25% of an electronegative element. The result is the production of electronegative and electropositive molecules with self-similar geometry, structure, chemical properties, and electrical characteristics. In essence, the reaction would be mirrored for both molecules. In the tungsten bronze example above, the ratio of 75% tungsten and 25% of the electropositive metal was selected to create "M", the alloy. The percentages may be adjusted as long as the primary portion of "M" is comprised of at least 51% of the TMO and the minor portion—the metal, non-metal or combination thereof or "N"-comprises between 49% and 1% of "M".

The alloyed metals can consist of two or more elements as long as they produce a stable alloy with the self-similar properties described above. The minor portions or "N" contributions to the electronegativity consists of a 2 or 3 period element and/or a 3d metal, which allows the "M" in $Na_{0.9}MO_3$ to consist of a 4d or 5d TMO whose higher component reacts with higher oxidation states whereby the lower molecular weight atom will react easily with lower oxidation states. Therefore, the "M" can work from the highest to lowest (complete range) of oxidation states.

Figure 8A:
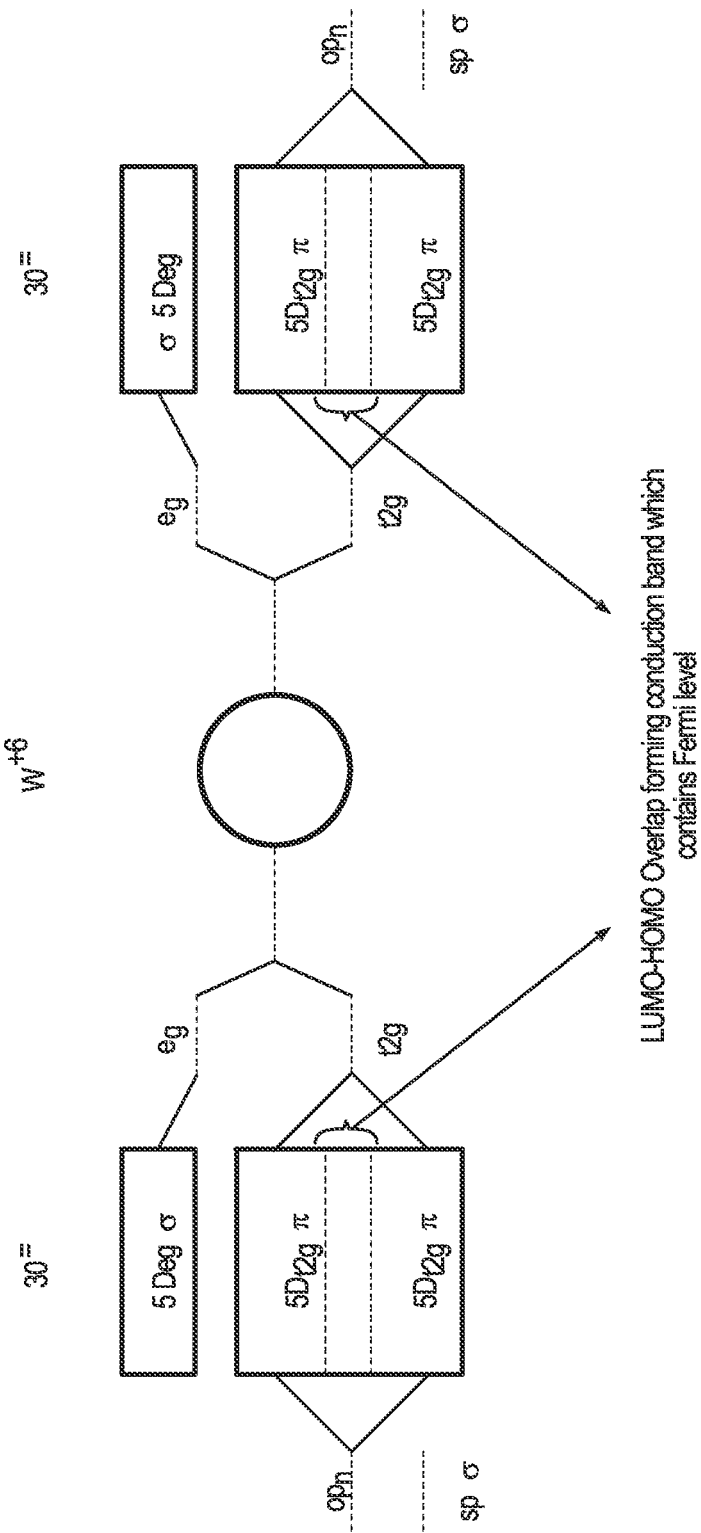
FIG. 8A is a schematic of the electronic structure of the battery of FIG. 1B.
Figure 8B:
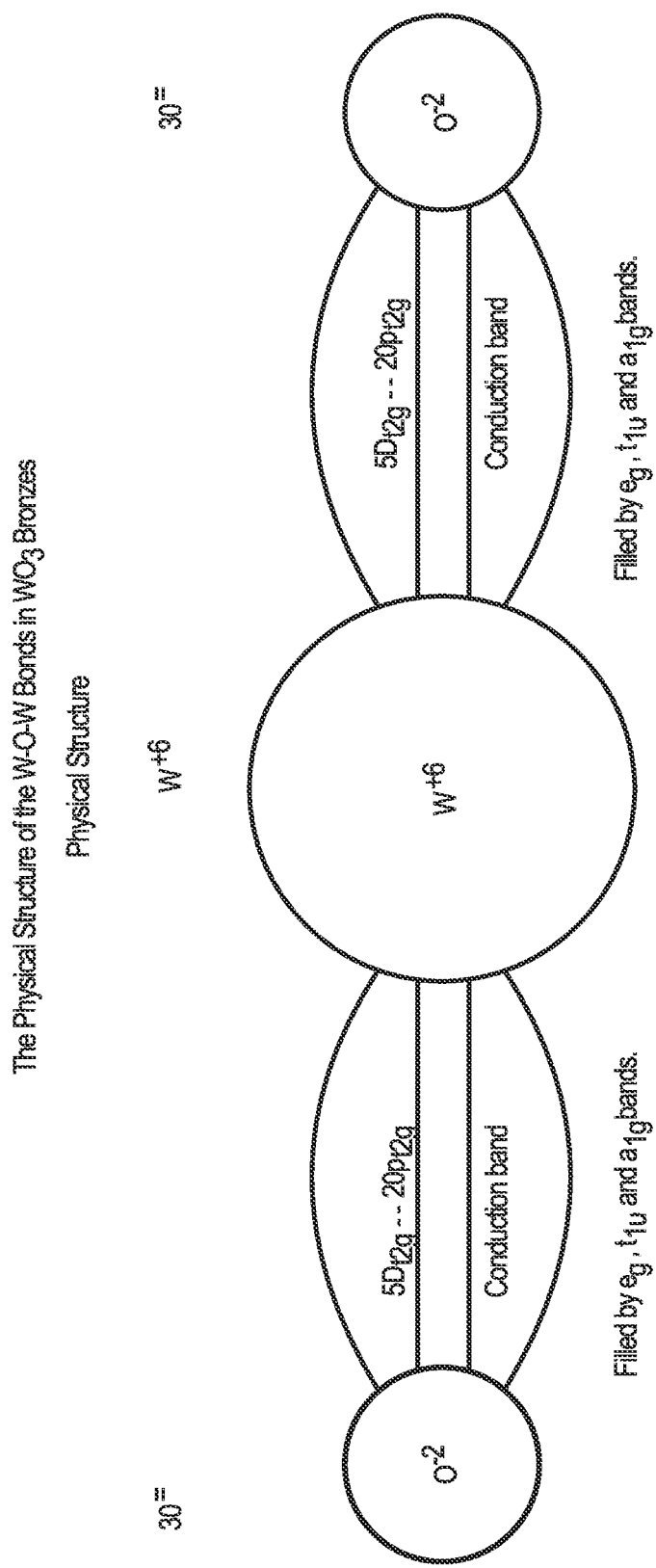
FIG. 8B is a schematic of the repeating physical structure and conduction bands of the battery chemistry of FIG. 1B.

A general characteristic, which makes 4d and 5d TMO bronzes excellent choices for the chemistry of the new embodiment, is the result of anion intercalation. Using $Na_xWO_3$ with X=0.90 to 0.93 as an example: the $Na^+$ electrostaticly shields the conduction band and its electrons. As a result, the conduction band is split into $e_g$ and $t_{2g}$ portions that hybridize with the 2Op states, which have lower energy. Consequently, the energy of the conduction band is lowered along with its Fermi level, $E_f$. The lattice's modulus is rendered weaker. However, this provides the conduction band the flexibility to bend with oxidation or reduction, which always results in a slightly different geometry of the new unit cell. The flexibility and shielding are characteristics that allow the conduction band and its structural band the ability to follow the energy and varying geometry and to continuously access the circuit electrons in all energy states. FIGS. 8.*a*, 8.*b*, and 9 illustrate the electronic structure, the physical structure, and the conduction band changes due to chemical modifications of the molecules in the negative and positive half cells.

In the chemical theory underlying the new embodiment, an incoming electron can bind to an oxygen atom as part of a (W—O—W) bond, or the electron can oxidize a neighboring Tungsten atom, which forms a $W^{+5}$ site. As an example, a circuit electron can aid in the formation of an $(O-M^+)$ bond with an intercalated Group 1, 2, or 3 electropositive metal such as Na. While the Na's electron oxidizes, the $W^{+6}$ falls to the conduction band resulting in the bond $W^{+6}$—$O^{-2}$—$Na^+$ ($W^{+5}$).

It is possible for electrons to reach the conduction band as the Tungstens are further reduced or oxidized. Initially and with tungsten in the +6 state, $WO_6$ units are joined via sharing at only the corner oxygen atoms. However, as the oxygen-to-tungsten ratio decreases, the units become more intricately joined in combinations of corners, edges, and faces to form chains, slabs, etc. The loss of each oxygen atom from an oxide lattice means that two electrons are added to the conduction band of the lattice. W and O, where the oxidation state of the tungsten is below +4, exists in clusters. However, the clusters are identical in form having a common conduction band, which connects with the higher oxidation states and rows of repeating units.

A class of TMO compounds that can achieve the above sequences are 4d or 5d transition metal oxides or bronzes. Electron interaction provides the charge compensation electrons by way of oxidation and reduction. Conduction band filling and electropositive electron sources such as anions from Group 1 or Group 2 elements also add electrons to the conduction band. These charge compensation electrons aid in increasing electronic, or energy, density of the bronze or oxide such that a $W^{+6}$ cation with complete oxidation can easily add 7 electrons to the current in the circuit. Examples of the reactions of the complete circuit are shown in FIG. 3 (as a bronze) and FIG. 4 (as a non-bronze).

The common molecule of Sodium Tungsten bronze ($Na_xWO_3$) will be used as an example. The common oxidation states of Tungsten are +6, +5, +4, +3, +2. However, the states of +3 and +2 must be formed in clusters of $W_4O_6$ and $W_4O_4$ or by alloying Tungsten with a minor "N" component of a 3 or 3d element, both of which are capable of redox chemistry with electrons as the metallic conductor. Tungsten alloys are another way of achieving oxidation states from $W^{+6}$ to $W^{+1}$. With reduction from $W^{+6}$ to $W^{+4}$, the $O$—$W^{+n}$ bonds of $W^{+6}$—O—$W^{+6}$ are reduced but still have the 6 bonds in their unit cells $W^{+n}$—O—$W^{+4}$. Both oxidation species are stable and have metallic conductivity. $W^{+6}$—$W^{+4}$ redox and atmosphere chemistry is further described in FIG. 4.

Figure 5:
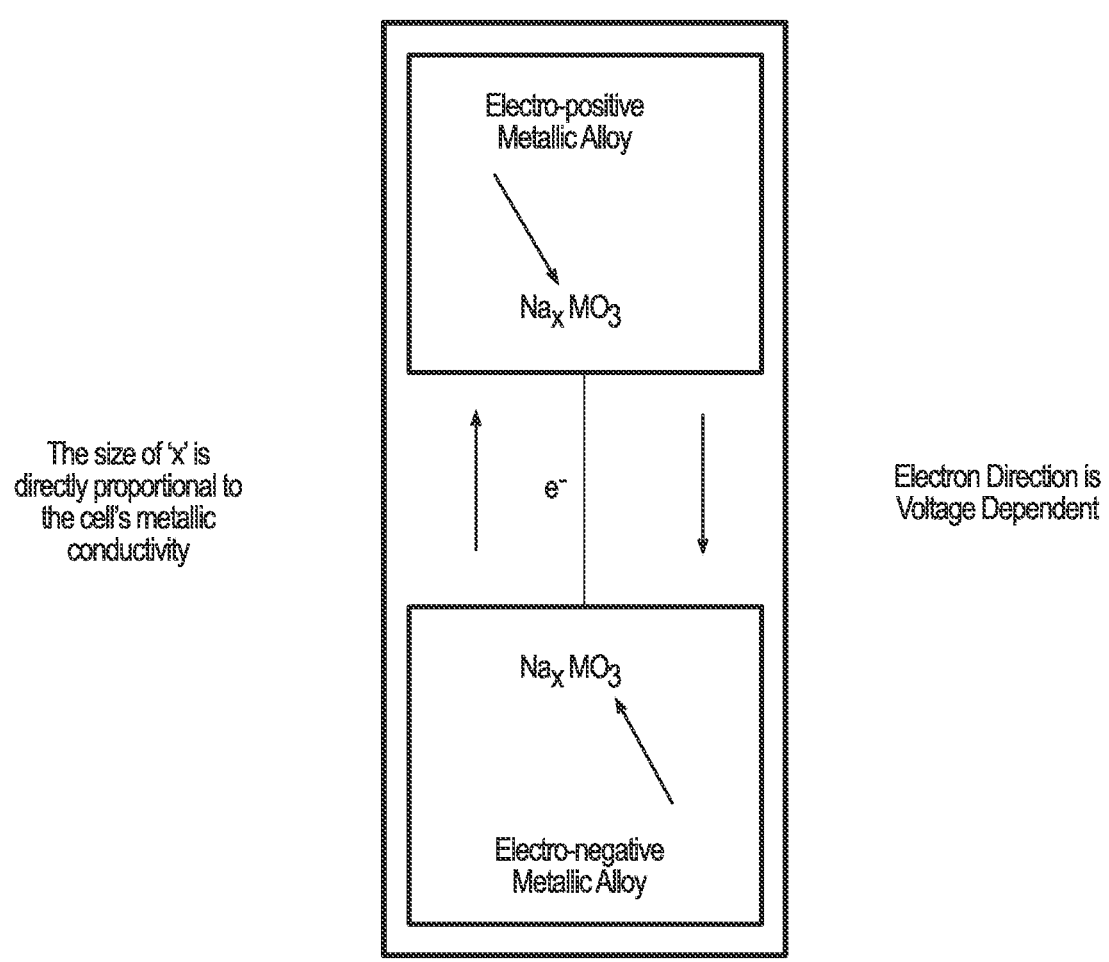
FIG. 5 is a schematic view showing electronic connection of the battery of FIG. 1B.
Figure 6:
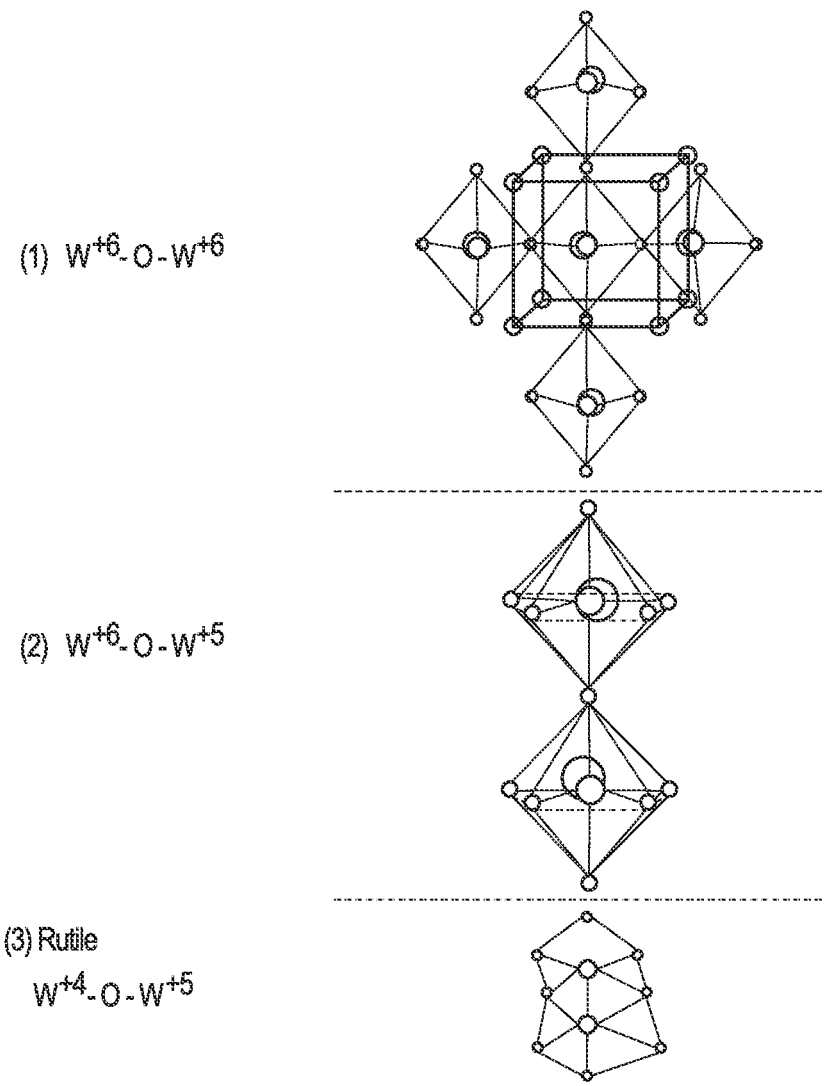
FIG. 6 shows the structure of the anodic and cathodic material of the battery of FIG. 1B.

FIG. 5 is a diagram of the new structure with two simple cells of electronegative and electropositive molecules, both having continuous O-M-O bonds. Its structure, as illustrated by FIG. 6, consists of identical molecular bonds attached by W—O—W at all six corners of an octahedron. $W^{+4}$ is also metallic and stable (see FIG. 6). The repeating molecules of $W^{+4}$ remain attached by W—O—W bonds at their edges. One physical difference, however, is that the repeating molecules of $W^{+4}$ can also be attached between molecules in an extended Rutile structure, and short metal-metal bonds connect the repeating molecules.

Redox and molecular atmospheric chemistry are very similar in this system: Oxygen and its ions are exchanged resulting from redox reactions on the molecules. Their unique chemistries are shown in FIG. 3 for Tungsten clusters. With respect to the clusters containing $W^{+3}$ and $W^{+2}$ (FIG. 7), charge compensation is such that few bonds are required, because space is at a premium. These bonds typically consist of lower oxides of W—O—W, W—W, W—W—W. These oxidation states, as mentioned earlier, are clusters: $W_4O_6$ and $W_4O_4$ both of which are stable and metallic.

A unique way of making the chemistry of the positive and negative cells has been described above. The result is two chemistries being mirror images of each other where the major difference of the chemistries is derived from the electronegativity(s) of the Tungsten alloy(s).

The Tungsten Bronze will continue to be used as an example of oxidation and reduction chemistry. The initial Tungsten oxidation state of +6 will be used as the reference frame for all electron reduction. However, Tungsten +6 which is produced as a result of the oxidation of $W^{+5}$ has almost identical chemical characteristics.

The reactions producing the $W^{+4}$—O bonds are different from those which produce $W^{+6}$—O or $W^{+5}$—O bonds because of space requirements and charge compensation. The geometry of the $W^{+6}$ and $W^{+5}$ bronzes change from a $W^{+6}$—O bond to a combination of $W^{+6}$ and $W^{+5}$ oxide bonds forming an 8-sided octahedron. $W^{+4}$ forms a flattened octahedral geometry (Rutile) consisting of $W^{+4}$ and W—W bonds. The shortened W—W bonds occur between some of the repeating $W^{+4}$ molecules. The +6, +5, and +4 Tungsten bronzes are occupied by, in our example, the anion $Na^+$ via intercalation, which results in a (+n−1) Tungsten cation oxidation. Conduction increases with the primary Tungsten oxidation because of the varying $W^{+4}$ oxidation state and the flexible $O^{-2}$ charge cloud. Lower electronegativity produces a $W^{+5}$ bond where the electron is delocalized relative to a $W^{+6}$—O bond, thereby allowing extended delocalized metal-like movement in the conduction band. In the case of $Na_xWO_3$, the LUMO $5W_{t2g}$-$2Op_{t2g}$, is the conduction band. As a characteristic, 5d bonding is wide and can hybridize with both eg and π bonds allowing smaller unit cells and varying geometry. For $W^{+6}$, the LUMO $6Wd_{t2g}$-$2Op_{t2g}$ is the conduction band. As reduction continues from $W^{+6}$, there is a continual change from the octahedral structure to the purely rutile structure of $W^{+4}$. Within a specific unit cell, the conductivity increases with x. This is due to the lattice expansion caused by the removal of a positive charge from $W^{+n}$ as the Na ion is added. As the result of these chemistries being electrolyte free, viscosity variation as a function of temperature is not an issue, and electric conductivity over large temperature ranges stays fairly constant at around $6.7 \times 10^6$ (Ohmmeter)$^{-1}$. Because the chemistries of the embodiment are solid state and metallic, they can stand a high rate of charging as well as discharging without producing resistive heat. The varying unit cells of a $W^{+6}$—$W^{+5}$ reduction maintain a continuous chain; the same is true during oxidation in the positive ½ cells. The conduction bands have a metallic conductivity, and the conduction properties vary little regardless of the redox condition. Consequently, the charge produced at one end of the chain can be found at the other end. The whole system can be considered a varying electrical field. The conductivity increases with lower charge as the result of changes in the electronic structure of the reducing $W^{+n}$ atoms, and the increase in percentage of metallic bonds in lower oxidation states. In other words, electron mobility in the conduction band becomes more metallic as a direct function of reduced oxidation states. Note, for simplicity, we have shown primarily reduction for examples. Oxidation has the same characteristics, except in reversed order. This can be considered an example of chemical symmetry.

Figure 7:
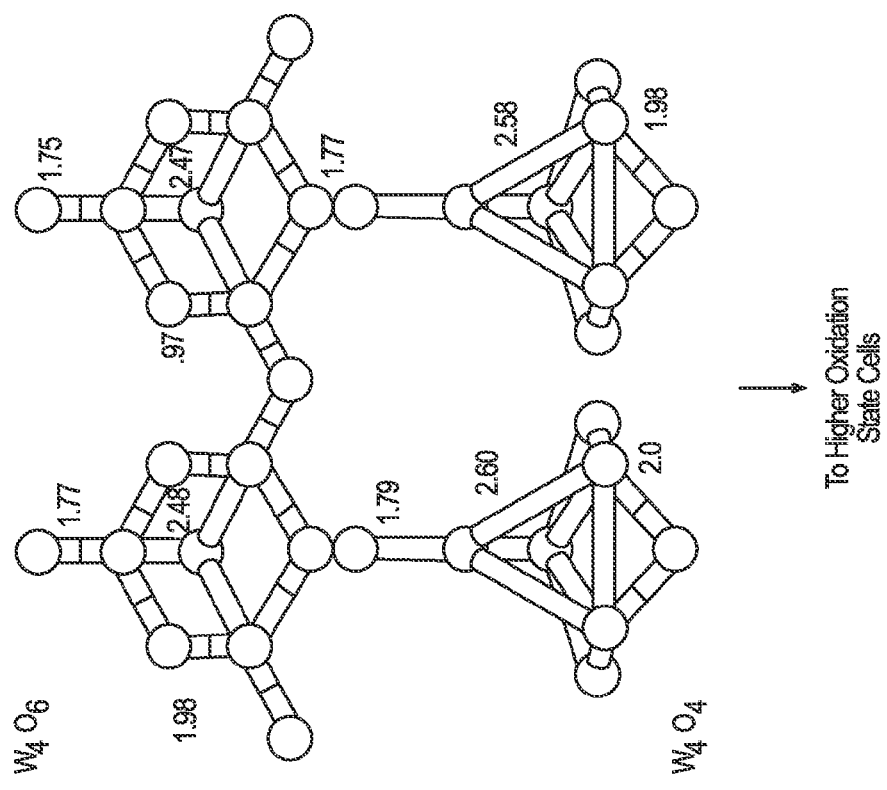
FIG. 7 shows the structure of the anodic and cathodic material of the battery of FIG. 1B.

FIG. 1.a shows the individual chemistries for unit cells containing $W^{+6}$, $W^{+5}$, and $W^{+4}$. FIG. 2 shows the individual chemistries for unit clusters containing $W^{+2}$, $W^{+3}$ and from the circuit current originating from the negative ½ cell after transversing the positive ½ cell and completing the circuit. FIG. 6 shows the corner sharing molecules in the $W^{+6}$—$W^{+4}$ units. All of the W—O—W bonds are identical. FIG. 7 shows the structure of the linked +1 unit $W^{+4}$—$W^{+2}$ clusters. All of the conduction bands attach together producing one common conduction band throughout. Per each $W^{+6}$ the distribution of electrons can be 7 or more electrons due to intercalated anions and multiple electrons resulting from various reactions occurring in and around the conduction band. Their redox and atmospheric chemistries are shown together in FIGS. 3 and 4.

The conduction band, which is located in the interior of the structure of the connecting bonds (see FIG. 7) has the following relationships with respect to oxidation states: Regardless of the oxidation state, conduction in the W—O—W bonds increases with increasing anion intercalation. The lower the oxidation state the higher the percentage of the W—W bonds as a result of limited space. Conductivity increases in W—O—W bonds with lowering of the oxidation state, which is due to electron delocalization with respect to the cation.

The invention has two multiple uses; including, but not limited to:

1) Energy storage, including capacitors—in this configuration a half cell containing a TMO with suitable characteristics for ease of reduction is reduced to the lowest stable oxidation state.

2) The high energy density battery contains half cells with TMOs with complimentary or identical redox characteristics.

In a battery configuration, the TMOs in a negative half cell are discharged, and the electrons flow to an internal conductor and then to the external circuit. The electrons then enter the positive half cell and reduce its chemistry. During reduction, the electrons flow into the negative half cell via an internal circuit acting as a charge balancing device, which also keeps the voltage in equilibrium. It allows for equilibrium charge compensation via a redox reaction when the battery is not in use.

The exterior shape of the invention can be modified per requirements for energy storage or battery demand. The shape of the reducing or oxidizing active medium can respond to the needs mentioned above and are only limited by unreasonable thermodynamic restraints. Typically, the solid-state active mediums can be configured for use as a single unit within the half cells or can be fabricated as thin structures or membranes in a wafer-like unit connected in series or parallel. The system can be very compact per unit of stored energy.

Figure 9:
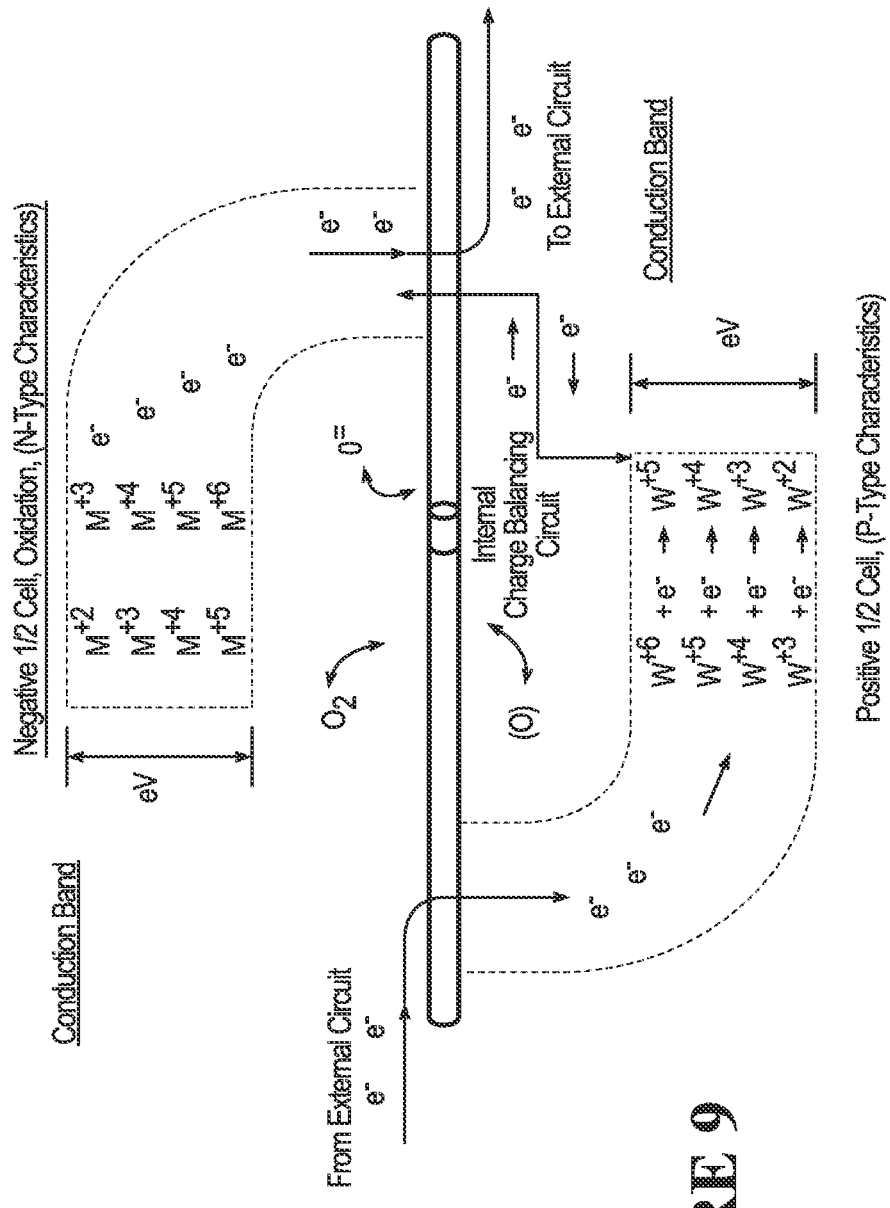
FIG. 9 is a schematic of the conduction band mechanism of the battery of FIG. 1B.

The relationship between the connecting W—O—W bonds, the conduction band, the molecular orbital of a $W^{+n}$—O—$W^{+6}$, and the basic electronic structure of the $W^{+6}$ are shown in FIG. 8.a. The voltage between the reactions occurring in the two half cells is a function of which oxidation states are taking part in the redox reaction at a given time (FIG. 9) as well as the complimentary N-Type and P-Type characteristics of the redox chemistry. The specific molecules in the half cells will be chosen such that the battery will produce a constant optimum potential to fit the customer's particular needs.

FIG. 7 shows the embodiment of the chemistry of the ½ cell of the lower oxidation states. All states can be modified by alloying with one or more metal. An example would be 75% W and 25% Titanium, ex: $Na_xMo_3$, where M=(75% W and 25% Ti). The electronegativity and electropositivity have identical bonds and oxidation and reduction electronics, conductivity, and physical characteristics, which is consistent with symmetric properties.

In an alternative embodiment of the present invention, the lower oxidation states of $M^{+2}$ and $M^{+3}$ form clusters which, in many instances, are not reversible. The problem can be avoided by alloying a high 4d or 5d transition metal (i.e., $M^{+6}$) with a lower period element such as a 3 or 3d or similar element having lower oxidation states such as +2 and/or +3 and having molecules for a given lattice whose chemistry is reversibly available with the chemistry of the higher states (see FIG. 7).

To avoid confusion in the following discussion, all heavy metals will be labeled by M (+6, +5, +4), and elements with +2 and +3 oxidation states appearing in the Periods 2, 3, or 3d will be labeled by V.

At high oxidation states (M), the circuit's redox behavior would be controlled by the 4d or 5d metal. At low oxidation states, V metals would control the redox and electronegativity characteristics. The V can control the molecules and characteristics (physical and chemical) and would be continuously reversible. As one can see, its characteristic symmetry is the same with the highest to the lowest oxidation states (W, V).

The reactions of the lower oxidation states follow a Mars van Krevelen mechanism. In this embodiment, an electron from the exterior (reducing) current partially reduces the metal via re-oxidation that can occur at the (M-O-M)'s oxygen bond. Releasing the bonded oxygen produces an oxygen defect in the bond ($M^{+n}$-$M^{+n}$) and the release of 2 electrons, which reduces the single metal by 2 electrons each ($M^{+n-2}$) or both metals as in the ($M^{n-1}$-O-$M^{n-1}$) bond. The oxygen between the two (M-M)'s can be replaced by an $O^{-2}$ from the interior reaction or from an $O_2$ available from the atmosphere.

The reactions can be either reduction or oxidation in a given half cell. The electrical potential of the internal reaction will determine the direction of the redox reaction. Since the redox reaction is independent of the redox states of the metal, the reaction is symmetric. In fact, the redox reactions follow the basic reflexive laws of geometry. The axis of symmetry acts as a divider where the two redox equations can be considered parallel to that axis.

The interior reactions will continuously run, as long as the half-cells are connected, there is interaction with atmosphere and the battery is not under load. In that instance, the two half-cells continually recharge the battery. Both half-cells run on redox reactions similar to those illustrated by FIGS. 1 and 2.

Another means of achieving the embodiment can be with minor portion alloys consisting of period 1, 2 and/or 3 metal(s), non-metals or combination thereof alloyed or bonded with 3d or Period 3 metal oxide(s). In this embodiment, the major portion, Tungsten, for example, behaves as shown in FIG. 6, which has been described by the embodiment above. The metal in $Na_{0.9}MO_3$, would consist of a common 4d or 5d transition metal oxide, and a smaller component, which will determine the electronegativity of the molecule. With this embodiment, a minor chemical or small molecule can direct the electronegativity of the entire chemical structure. For instance, the system shown in FIG. 7 can be replaced by $Na_{0.9}$ (75% $WO_3$/25% TiO)$O_3$ where the TiO is electropositive with respect to its parent compound ($WO_3$).

To create an electronegative chemical structure, the TiO would be replaced with an electronegative element or molecule such as with 75% $WO_3$/25% $SiO_2$ (see FIG. 7). As seen in FIG. 7, Ti oxides in the positive half-cell form crystals consisting of two tetrahedrons, which make an octahedral structure. In the $TiO_2$ state, the crystal is in the Rutile structure, which notably has the same symmetry as the high oxidation states. The family of compounds congruent with (75% M)/(25% 3d oxides) are alloyed together to complete the embodiment. Some of the electronegative segments can be $SiO_2$, NO, $NO_2$, $NO^-_3$, CO, Boron oxide, phosphorus oxide, and all other combinations of metal(s), non-metal(s), and combinations of the above thereof, and Neso-, Cyclo-, and Soro-Silicates, etc.

Taking into account the above information, active chemical structures consisting of various types of repeating common 4d or 5d TMOs (or an alloy) or its Bronzes, the $5d_{t2g}$-$2PO_{t2g}$ with electronegativity being modified to suit the needs of its half cell, or other similar 4d or 5d bronzes or oxides are the primary choices for both types of the cathode and anode chemistries. These are primary choices for the following reasons. The molecular orbitals are large and diffuse, which allow for the ease in overlapping necessary to form a metallic LUMO conduction band and to remain intact with oxidation variation. Moreover, the eg and $t_{2g}$ orbitals can possibly mix, which would also result in a larger conduction band-both spatially and energetically. Also, two or more TMOs can be mixed to produce an alloy with an exact electronegativity.

Due to geometric considerations, we are limited to a group of anions that allow repeated bronze octahedrons in the higher oxidation states. Since the literature states that the abilities of Group I anions' ease of donating an electron to tungsten are about the same, sodium would be an excellent choice. It is a common metal, thus easily obtainable. It allows an increase in metallic conductivity and metallic stability through x=0.93 and allows for metallic conduction in the conduction band while keeping a stable edge-sharing Perovskite geometry. The structure, made of repeating units of $Na_{0.9}WO_3$, contains a continuous metallic conduction band in its W—O—W bonds in the higher oxidation states and compatible bands in the lower states. It is desired to have reversible conditions and geometries with the $W_4O_4$ and $W_4O_6$ structures. A molecular structure with edge-sharing repeating units of $Na_xWO_3$ with x=0.93 has a conductivity in the vicinity of $7\times10^6$ (Ohm meter)$^{-1}$.

A second choice for an amion to reduce Tungsten would be the Group 2 metal Calcium. Calcium is an excellent choice because it delivers two electrons to the Bronze's conduction band. Calcium's +2 ionic radius is 1.00 A, which is essentially equal to Sodium's +1 ionic radius of 1.02 A. The oxidation potential for $Ca^{++}$ at 2.87 eV is close to $Na^+$ at 2.71. The metallic electronegativity of Ca (1.00) compares with Na (0.93). The literature mentions values between x=0.33 to 0.76 for a stable $Ca_xWO_3$ molecule. The $Ca_{0.5}WO^3$. molecule has a perovskite geometry, which is based on the fact that $Na^+$ and $Ca^{++}$ have nearly identical diameters. The molecule is chemically and physically stable up to 450° C. and exhibits metallic conductivity. Therefore, two good choices for electron discharging molecular structures in the negative ½ cell are $Na_xWO_3$ (x≈0.9) or $Ca_xWO_3$ (x≈0.5). The exact value of x for $Ca_xWO^3$ depends on the maximum amount of calcium necessary to produce an edge-sharing Pervoskite structure with physical, chemical, and electronic properties as congruent as possible to the chosen $Na_xWO_3$.

The 20 hexagonal geometry with hexagonal tunnels has added advantages for the system $A_xWO_3$ using, for example, A=(K or Rb or Cs) and x=0.33-0.76. With larger A, the vibration motion of the oxygen atoms are more restricted and the lattice becomes stiffer. In addition, with anion size, changed density wave (CDW) instabilities are lessened and greater electron conductivity occurs.

Figure 10:
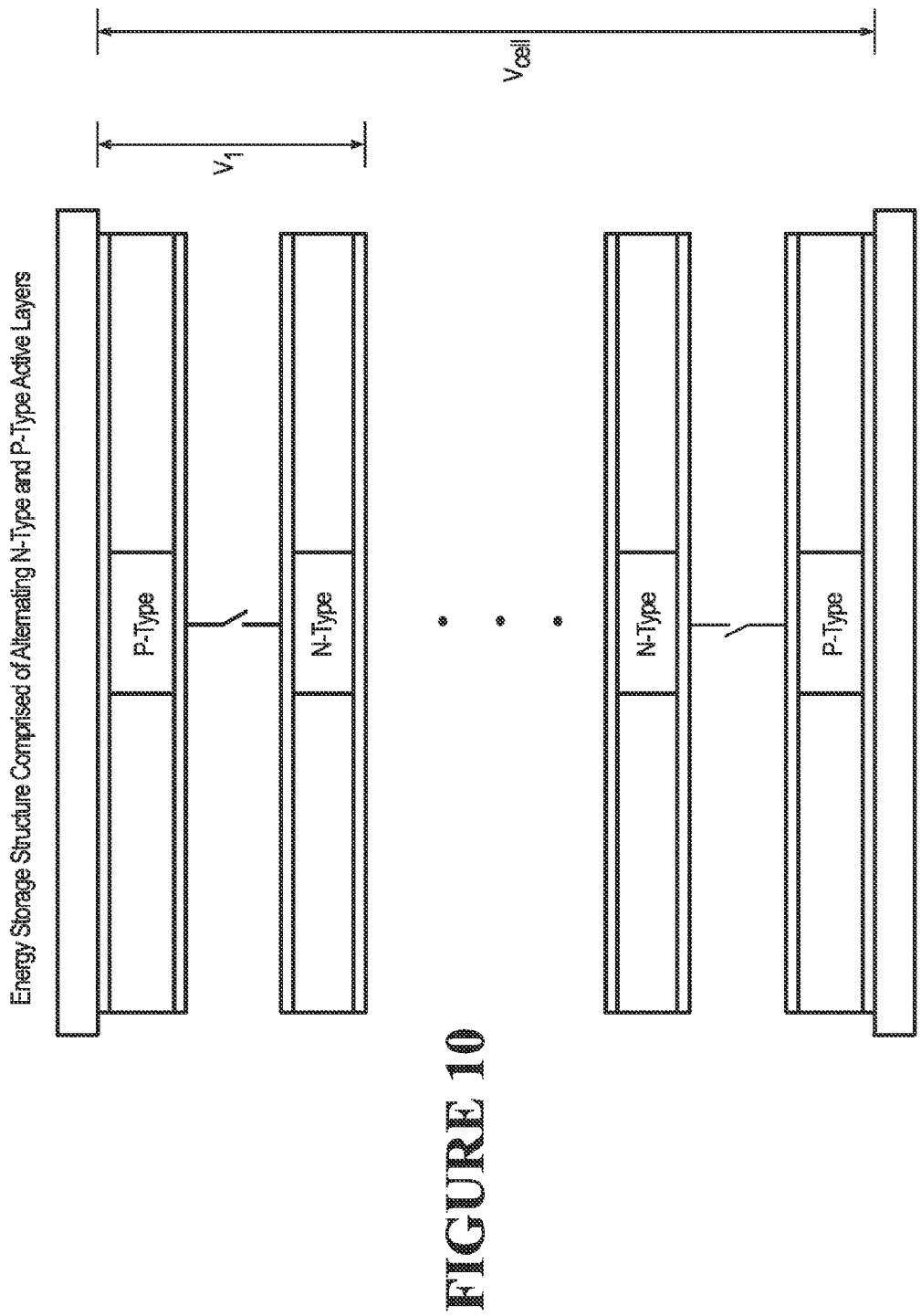
FIG. 10 is a schematic of the battery if alternating anodes and cathodes are used in FIG. 1B.
Figure 11B:
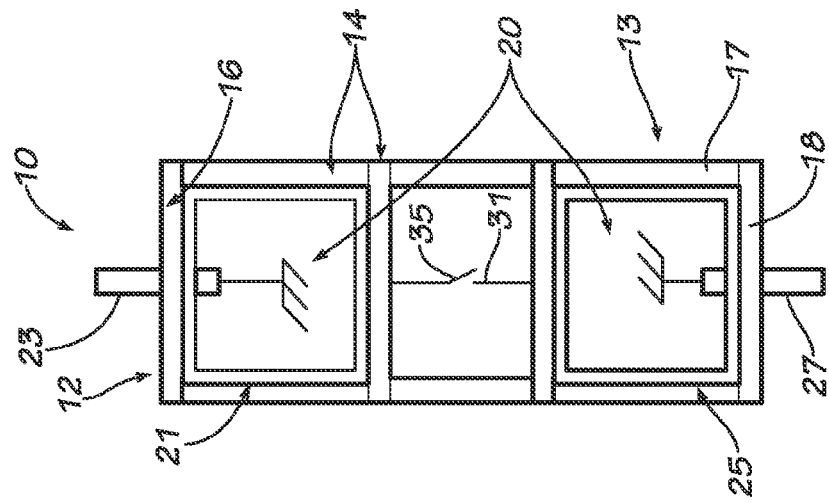
FIG. 11B is a schematic of the battery of FIG. 1B.
Figure 11A:
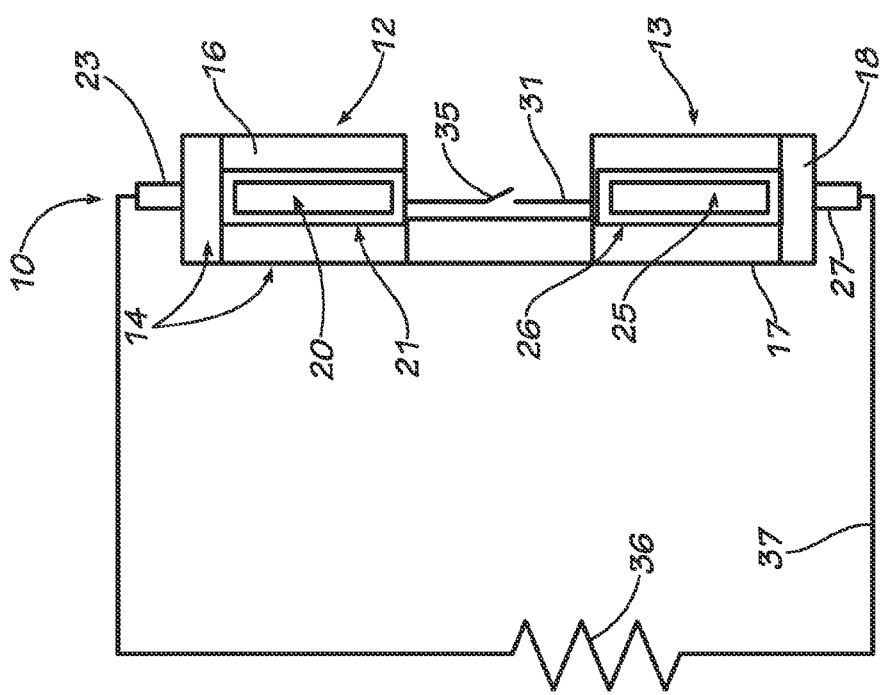
FIG. 11A is a schematic of the battery of FIG. 1B.

Another configuration of the invention is shown in FIG. 10. Thin sheets of the active redox structure having alternating N-type and P-type characteristics can be stacked on top of each other, separated with a suitable nonreactive sheet permeable to oxygen and its ions, if necessary. The system's voltage is a function of the number of sheets included. The stacked configuration of FIG. 10 could be easily rolled into a cylindrical shape in order to save space or to fulfill requirements of standardized form-factors.

A choice of the P-type repeating molecule in the positive ½ cell is the P-type Tungsten Oxyfluoride with low levels of fluorine. Its structure is stable with metallic conductivity. The reduction potential of the Oxyfluoride ($\approx 2.5V$), with contributions from its Fluorine and the Tungsten, combined with the oxidation potential provided by the negative half cell's Bronze, which is a combination of electron addition via the Calcium to the Tungsten's conduction band-plus the oxidation potential from the Tungsten itself—can conservatively provide 3.5V per cell. As mentioned above, another way to pick the electronegative molecule would be to make an alloy of transition metals giving a molecular oxide whose molecule with an 'M' is alloyed to produce a molecule (i.e., $NaMO_3$ or $MO_3$) with the needed electronegativity.

The electronegativity of Tungsten bronzes can also be modified by allowing it to alloy with an electropositive element such as Titanium. This would give N-type properties for negative cells. Also, this would make the lower +2 and +3 oxidation states more readily available than with only Tungsten. The conduction bands in T-W and T-O—W bonds should be easily compatible with the higher Tungsten oxides. The same process can be used to give Tungsten P-type characteristics by alloying with the appropriate electropositive metal. If the above technique is used, the low oxidation units, as illustrated in FIG. 6, would not be needed. The central metal would be a 75:25 ratio of a 4d or 5d transition metal with a 3 or 3d element, which should allow for a wide range of oxidation states, possibly from +6 to +1 or more. The same technique is used in the Tungsten and an electronegative alloy. Here, 75% of the alloy remains to be 75% W and the electronegativity needed in the negative ½ cell is alloyed with an electronegative element (i.e., $TiO_2$) or electronegative groups. In this case, the basic structure consists of a bronze of $Na_{0.9}(M)O_{3-0.9}F_3$, where (M) is (75% W and 25% V). This technique allows the same type of chemistry working in redox as the oppositely charged half cell.

In the chemical theory of the new embodiment, an electron from the external current binds to the Oxygen of the $W^{+6}$—O—$W^{+6}$. The electron is then transferred to a neighboring Tungsten atom whereby a $W^{+5}$ site is formed, which is analogous to the case of a singly charged bond with a vacancy in $W^{+6}$—$O^2$—$Na^+$ ($W^{+5}$). The conduction band density of states (greater than 2.5 eV from the band edge) can be obtained from a simple electrochemical chronopotentiometry experiment.

The potential difference provided by the two chemistries of the half cells can be modified to meet the requirements of a particular application or product via chemical synthesis (i.e., $Na_{0.93}MO_3$) by means of varying the electronegative 'M' with respect to an electropositive 'M', or 'M' can be an alloy of two or more elements. The various 'M' constituents can be voltage guided if the constituents consist of more than 50% of the total metal content and have varying electronegativities.

Another large potential span can be achieved by having a neutral metal consisting of 75% total metal of a 4d or 5d transition metal, with the remaining 25% being a more electronegative metal (i.e., $Na_{0.93}$ (75%, 25%)), and the cathode chemistry can consist of the identical 60% composition of metal, especially having the same electropositive molecule mentioned above. Characteristics of electronegativity comprise the remainder 'M' consisting of an oxyfluoride. Any metal of most groups can be alloyed together to make the central 'M' of $Na_{0.93}MO_3$. Seventy-five percent of the two bronzes' transition metals can be the same, and 25% of an anion would be alloyed together to control the potential difference of these two half cells.

The uniqueness of the metals along with the symmetry of the molecules in the two half cells and with each of the chemicals' parallel chemistry per oxidation state leads to a repeating chemical sequence such that identical molecular bonds form at the corner of an octahedron where oxygen forms 6 conductive and structurally identical bonds (see FIGS. 6 and 7). The entire chemical structure in each ½ cell is made of repeating M-O-M bonds forming a continuous structural and conductive bond throughout the ½ cell. Molecular symmetry forming identical mirror-like physical and chemical properties in each half cell is the main descriptor of the embodiment herein.

Both chemistries in the positive and negative half cells can be found to be symmetric in that (1) the exterior molecules will look the same in both half cells and will have the same basic bond structure, (2) both anode and cathode chemistries have the same mechanisms, (3) the anode consists of molecule(s) being electropositive, (4) the anode will have identical crystalline units, comprised, for example, of tungsten ($WO_3$), Octahedral, $TiO_2$-Rutile and TiO-Octahedral. Most of the geometry is composed of either M-O-M, O-M-O, or M-M, (4) Cathode: $Na_{0.9}MO_{3.0-0.40}F_{0.40}$: M=75% W and V=25% electronegative molecule(s). The second iteration will not have a fluorine in the composition, and the V will be a single or group of molecules which are electronegative, (5) Both molecules will look like the following: $Na_{0.9}MO_3$ variation eing M=75% W and 25% electropositive molecule(s) which is the primary controller of electronegativity in both moleculates, i.e., an anode with M=75% W and 25% $TiO_2$. $TiO_2$ has a Ruile structure and TiO has an actahedral structure, (6) Anode: An oxidation state very close to the six-sided octahedron-rutile ($Ti^{+4} \rightarrow Ti^{+2}$) shapes range from pure cubic to Rutile. The $W^{+6} \rightarrow W^{+4}$ will have the following bonds: $W^{+n}$—O—$W^{+n}$, $W^{+n}$—O—$W^{+(n-1)}$, $W^{+n}$—$W^{+n}$, $W^{+n}$—$W^{+(n-1)}$ (Rutile), etc., (7) Cathode: For the oxidation states $W^{+6} \rightarrow W^{+4}$, the structure will be: octahedral→Rutile. For the oxidation states $W^{+4} \rightarrow W^{+1}$, 25% electronegative molecules(s), a single group with an electronegativity of approximately 2.9, a metalloid or electronegative metal/nonmetal or oxides can consist of the 25%, (8) Symmetry: Both the anode or cathode chemistry molecules will have in common: (a) close to the same geometry when the two molecules are in the same oxidation state. In most cases, the bonds will be identical for both half cells. The same half cell at the same oxidation state as the other half cell will have equal reactions, and (b) the two primary redox reactions making the chemistries in the half cells symmetrical would appear like the following:

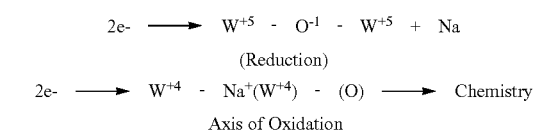

and (7) Recharging (FIG. 5) a unique mechanism, which is going on simultaneously, is that oxygen and its ionic species are constantly reacting due to the internal flow of electrons. Their mechanism is identical to those shown in FIG. 2.

It thus is seen that an air battery is now provided which overcomes problems associated with those of the prior art. It should of course be understood that many modifications may be made to the specific preferred embodiment described herein, in addition to those specifically recited herein, without departure from the spirit and scope of the invention as set forth in the following claims.

The invention claimed is:

1. An air battery comprising:
    a negative half cell having a mass of anode material in electrical contact with an anode current collector, said anode material being positioned within the interior of a housing in fluid communication with ambience, said anode material being, in part a transition metal bronze;
    a positive half cell having a mass of cathode material in electrical contact with a cathode current collector, said cathode material being positioned within the interior of a housing in fluid communication with ambience, said cathode material being, in part, a transition metal bronzes, and
    an electrical conductor extending between and in electrical contact with said positive half cell and said negative half cell, said electrical conductor including an openable switch.

2. The air battery of claim 1 wherein said anode material is cation which is a 5d transition metal oxide.

3. The air battery of claim 1 wherein said anode material is sodium tungstate dihydrate.

4. The air battery of claim 1 wherein said cathode material is cation which is a 5d transition metal oxide.

5. The air battery of claim 1 wherein said cathode material is sodium tungstate dihydrate.

6. The air battery of claim 2 wherein said cathode material is cation which is a 5d transition metal oxide.

7. The air battery of claim 3 wherein said cathode material is sodium tungstate dihydrate.

8. The air battery of claim 1 wherein said housing includes a plurality of holes to allow the fluid communication of said anode material and said cathode material with ambience.

9. An air battery comprising:
    a mass of anode material in electrical contact with an anode current collector and positioned within a first housing portion the interior of which is in fluid communication with ambience, said anode material being a transition metal bronzes;
    a mass of cathode material in electrical contact with a cathode current collector and positioned within a second housing portion the interior of which is in fluid communication with ambience, said cathode material being a transition metal bronzes, and
    an electrical conductor extending between and in electrical contact with said anodic half cell and said cathodic half cell, said electrical conductor including an openable switch.

10. The air battery of claim 9 wherein said anode material is cation which is a 5d transition metal oxide.

11. The air battery of claim 9 wherein said anode material is sodium tungstate dihydrate.

12. The air battery of claim 9 wherein said cathode material is cation which is a 5d transition metal oxide.

13. The air battery of claim 9 wherein said cathode material is sodium tungstate dihydrate.

14. The air battery of claim 10 wherein said cathode material is cation which is a 5d transition metal oxide.

15. The air battery of claim 11 wherein said cathode material is sodium tungstate dihydrate.

16. The air battery of claim 9 wherein said housing includes a plurality of holes to allow the fluid communication of said anode material and said cathode material with ambience.

* * * * *